Jan. 28, 1969 A. W. TYLER 3,425,048

IDENTIFICATION SYSTEM FOR EDGE COATED CARDS

Filed Oct. 1, 1965 Sheet 1 of 3

INVENTOR.
ARTHUR W. TYLER
BY
Stanley Belsky
ATTORNEY

INVENTOR.
ARTHUR W. TYLER
BY Stanley Belsky
ATTORNEY

INVENTOR.
ARTHUR W. TYLER
BY Stanley Belsky
ATTORNEY 3,425,048

IDENTIFICATION SYSTEM FOR EDGE COATED CARDS

Arthur W. Tyler, Weston, Mass., assignor to Itek Corporation, Lexington, Mass., a corporation of Delaware
Continuation of application Ser. No. 162,488, Dec. 27, 1961, which is a continuation-in-part of application Ser. No. 45,438, July 26, 1960, now Patent No. 3,096,882, dated July 9, 1963. This application Oct. 1, 1965, Ser. No. 497,589
U.S. Cl. 340—174.1 3 Claims
Int. Cl. G11b 5/44

ABSTRACT OF THE DISCLOSURE

The invention is directed to a data processing device for detecting and distinguishing one planar data bearing member from among a plurality of such members. More specifically a device is disclosed for serially reading coded information on the edge of cards with a single unitary sensing head.

This application is a continuation of my copending application No. 162,488, filed Dec. 27, 1961, now abandoned, which in turn is a continuation in part of U.S. application 45,438, filed July 26, 1960, which matured into U.S. Patent No. 3,096,882 on July 9, 1963.

The present invention relates to data processing. More particularly, the invention relates to a data processing system for transporting, locating, segregating, retrieving and reading of data bearing media. More especially, the invention relates to handling distribution and switching of data bearing media including graphic data bearing cards or chips, such as photographic data, having predetermined identification coding. The term "data bearing medium or media" as used herein includes data bearing bodies, such as film chips, cards, and sheets and the frame carriers to support the bodies. The term further includes such bodies integrally formed with a carrier means.

In a copending application, by Donald S. Oliver, entitled, Magnetic Data Processing, filed Apr. 12, 1960, Ser. No. 21,754, now abandoned, a data processing system is described. All of the aforementioned applications are assigned to the common assignee of this Application. The present invention presents an improvement over the Oliver apparatus. In the copending Oliver apparatus, a data bearing medium, such as a film chip, photographic transparency or positive, cooperates with a guide transport system which slidably engages and supports the medium at an oblique angle. The media are preferably propelled under the influence of the flow of air.

In order to identify a given medium and program a desired path of transport, for purposes of selection, retrieval, recycling, etc., each medium is identification coded with a data code preferably magnetically recorded. A magnetic striping in this system is applied either to a film chip, or a carrier frame for the film chip, coplanar with the plane of the medium. The striping is recorded transversely and polarized across the face of the striping or magnetic tape. The polarization is preferably perpendicular to an edge of a rectangular medium. Fringe fields extend from the medium at the edge. The recording thus provides recorded data indicia which are linearly disposed at discrete intervals. Since the identification code can be polarized either with a north pole field fringing from the edge of the medium or with a south pole field fringing from the edge, a positive signal indicative of the presence of binary information is presented. In the event that a signal is below a predetermined threshold value in the interval sensed, the card is assumed to be defective in structure and/or function and is extracted from the system.

As noted above, the normal plane of a medium is at an oblique angle relative to its direction of motion. In the copending Oliver apparatus, a magnetically edge-coded chip is transported at an angle past a multi-channel magnetic sensing means. The means includes a number of individual heads which are disposed corresponding with the position of an identification code indicium interval. The gap widths, or sensing axes, of the heads are oriented at the same angle. Each head, therefore, reads only its corresponding digit. For a ten digit binary code, enough to handle 1024 separate data bearing media, ten magnetic sensing heads are required to provide a total indication of a given identification code. In general, for an N digit code, N heads are required. This poses a very difficult problem or registration since each had must be aligned with its corresponding digit interval. If, for some reason, the medium becomes out of registration with the heads, a misreading occurs and produces an error.

Because of the requirement for a separate and individual sensing head for each digit interval, an interrogation or recognition means coupled to the heads requires a complicated circuit with N independent, parallel input circuits.

Furthermore, excessive cross talk may be produced because of lateral variation in the spacing relative to the position of the head. These problems are overcome in the present invention by using only a single sensing head with the gap width or sensing axis oriented at an angle with respect to the linearly disposed discrete code indicia. Cross talk is eliminated by virtue of the requirement that the head read information from only a single discrete code interval at a given time. Since the head reads discrete identification code indicia an interval at a time and the indicia are linearly disposed at discrete intervals and angularly disposed with respect to the sensing axes of the head, the information is sensed in discrete increments at a time.

In a patent entitled, System for Recording Sound Magnetically, No. 2,906,287, issued Sept. 29, 1959, filed by T. M. Gordon, Jr., et al., a system is described in which transversely recorded magnetic tape is transported past a magnetic sensing head in such a manner that each information recording is oriented at an acute angle relative to the angle of a continuous sensing axis. In that system, the inventors cause the members of a series of narrow, discrete, parallel bands of magnetic material to traverse the gap of a magnetic recording head in such a way that the gap intersects the bands at an acute angle and progressively magnetizes the successive members of the series. This is accomplished by causing a tape formed from nonmagnetic material and provided with a series of narrow, discrete, parallel bands of magnetic material to travel at a constant velocity past a magnetic recording head.

The gap of the recording head is so disposed that it extends across the path of travel of the tape and intersects the bands thereon at an acute angle so that the gap will always be in recording relationship with at least one of those bands as the tape travels past the recording head. Note that in the Gordon system recording and playback is continuous and is with respect to continuous information.

Furthermore, the information is necessarily disposed in a plane for sensing or recording or playback purposes.

The present invention is distinguishable over the Gordon system in that linearly disposed data indicia at discrete intervals are used. The head responds to discrete information and produces an indication of the discrete information corresponding in time with the relative position of the discrete information bit. Furthermore, it is of significance that the Gordon patent is directed to the solution of a problem very different from that solved in the present invention. Gordon is attempting to increase the effective frequency response of a tape recording apparatus without changing the limitations imposed by the gap length. Here the invention is directed to the problem of flexibility obtaining discrete information from data disposed in discrete intervals.

In Patent No. 2,939,929, entitled, Magnetic Recording Mechanism for Selected Skew Recording, issued June 7, 1960, to C. W. Martin, there is disclosed a magnetic sensing head with a gap oriented at an angle with respect to continuous data. Here the tape has its plane surface displayed adjacent the gap. In contrast, the present invention displays a line of information to the sensing head and particularly to the sensing axis-defining member. The problem faced by Martin is distinguishable from that in the present invention. In the Martin invention, a mechanism is provided which permits a plurality of channels to be superimposed upon each other on a single track. He uses a single head with adjustable different discrete angles for recording a plurality of channels on a single track and then plays any one of the channels through with its respective angle. Whereas in the present invention the information is linearly disposed, his apparatus is entirely inapplicable and, in fact, is not operable. The Martin apparatus requires a planar display of information as opposed to the linear display of information used herein.

In Patent No. 2,929,670, entitled Apparatus for Producing Magnetic Records on Tape, issued Mar. 22, 1960, to Thomas R. Garrity, a mechanism is disclosed providing a magnetic recording head having a plurality of recording gaps which are disposed in angular relation to each other. However, there again the purpose of the invention is to provide a recording head of a type which can be utilized to produce a record having crossed spots, the magnetic axes of which are angularly arranged in relation to each other. This presupposes a planar display of information in contrast with the linear display or linear disposition of information of the present invention.

It is, therefore, an object of the invention to provide an improved data processing device.

It is a further object of the invention to provide an improved data processing system for handling data bearing medium having identification code indicia.

Another object of the invention is to provide an improved data processing device for handling data bearing media with a multiple digit identification code having the capability of reading the code without misalignment.

Still another object of the invention is to provide an improved data processing identification code with the capability of rapid readout while the medium is in motion.

Still another object of the invention is to provide an improved data processing device for handling data bearing media with an identification code characterized by simplicity of structure and ease of operation.

Yet another object of the invention is to provide an improved data processing device for handling data bearing media exhibiting greater simplicity and flexibility in the selection and control of the media.

A further object of the invention is to provide an improved data processing device for data bearing media having magnetically recorded identification code indicia.

Another object of the invention is to provide an improved data processing device for handling data bearing media capable of rapid, efficient, and accurate readout of magnetically recorded indicia.

In accordance with the invention there is provided a data processing device for a data bearing medium having recorded data indicia linearly disposed at discrete intervals. The device includes a transport means for receiving and propelling the medium along a desired path. Indicia responsive, sensing means are coupled to the transport means along the path. The sensing means has a continuous sensing-axis-defining member. The axis is oriented at an angle with respect to the linearly disposed indicia. The angular disposition of the indicia with respect to the axis is such that the sensing means produces discrete signals relative to time corresponding to the position intervals.

In one form of the inventon the indicia are magnetically recorded and the sensing head is magnetically responsive. The indicia are disposed adjacent an edge of the medium. The medium is planar with its line of intersection perpendicular to the sensing axis. The sensing-axis-member extends beyond the indicia.

In another form of the invention there is provided a data processing system. The system includes a data bearing medium having recorded data indicia linearly disposed at discrete intervals. Transport means receive and propel the medium along a desired path. Indicia-responsive, sensing means are coupled to the transport means along the path and have a continuous sensing-axis-defining member. The axis is oriented at an angle with respect to the linearly disposed indicia. The sensing means thus produce discrete signals relative to time corresponding to the position intervals. A recognition means is coupled to the sensing means for recognizing a desired medium. A program means is coupled to the recognition means for programming a desired instruction in the recognition means. Control means are coupled to the recognition means for producing a control signal in accordance with the relation between the instruction and a given set of data. Switching means are coupled to the control means for switching the medium in response to the control signal. Sorting means are coupled to the switching means for directing the medium in response to the switching means.

Other and further objects of the invention will be apparent from the following description of the invention taken with reference to the accompanying drawings.

Figure 1:
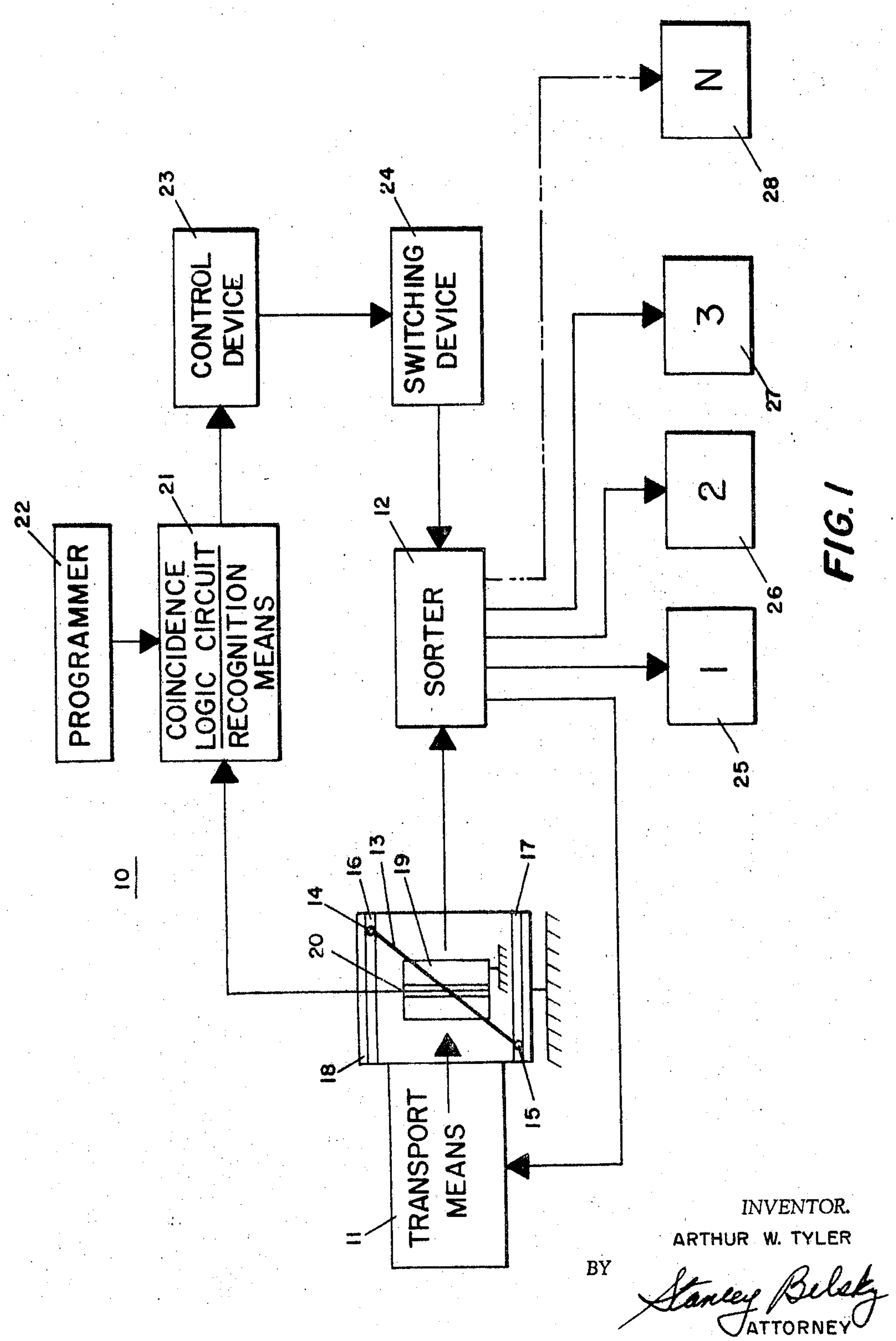
FIG. 1 is a schematic drawing of a data processing device embodying the present invention.
Figure 3:
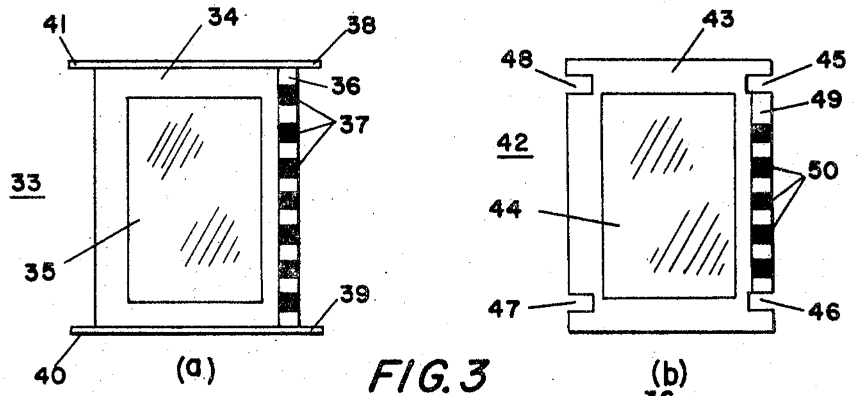
Figure 4:
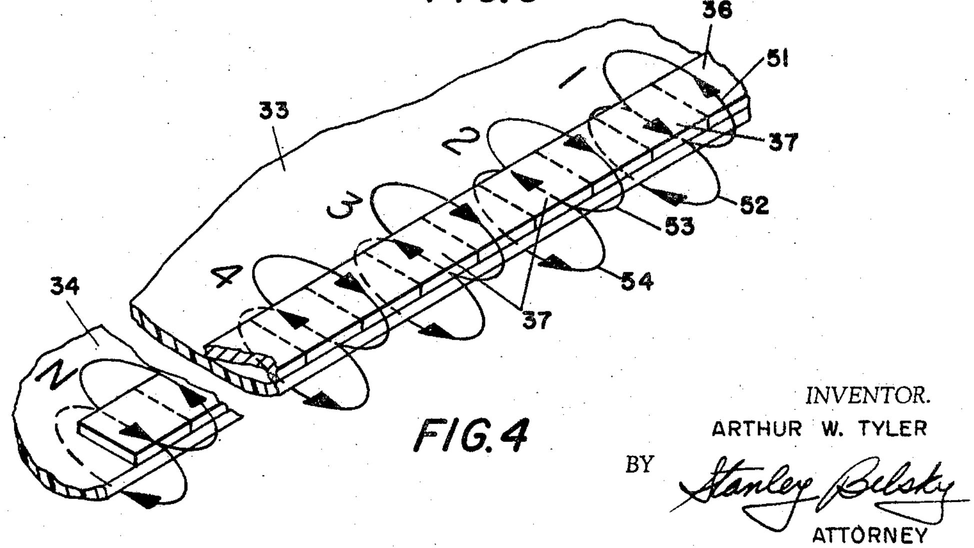
Figures 5, 6, 7:
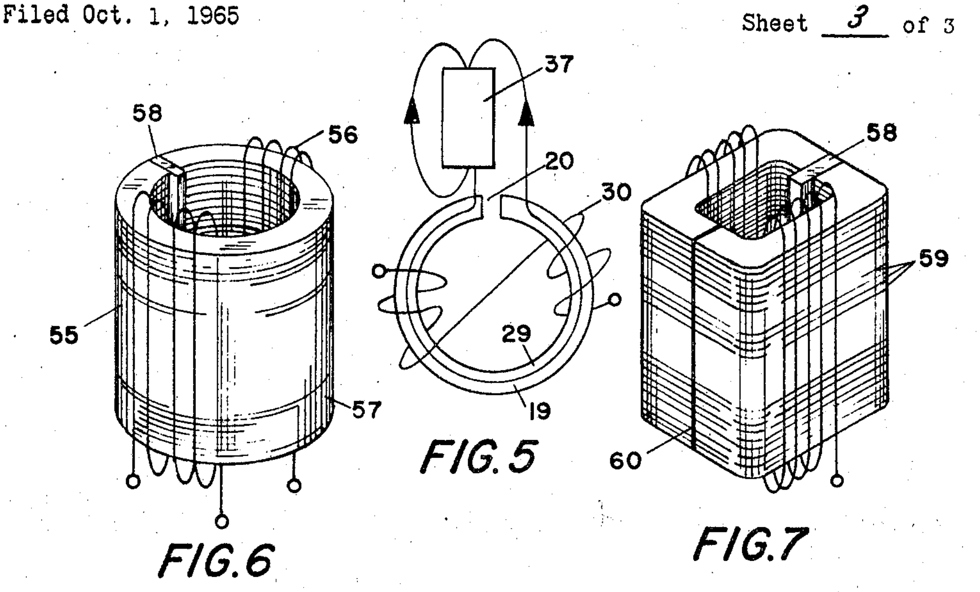

FIGS. 3(*a*) and 3(*b*) are plan views of data bearing media used in the device of FIG. 1;

FIG. 4 is an enlarged, fragmentary, partially schematic perspective view of a magnetic tape-bearing, data-bearing medium used in accordance with the invention;

FIG. 5 is a partially schematic, plan view of a magnetic sensing head and magnetic information bit illustrating an aspect of the operation of the invention;

FIG. 6 is a perspective view of a magnetic recording head embodying the invention;

FIG. 7 is a perspective view of a modification of the

Figure 8:
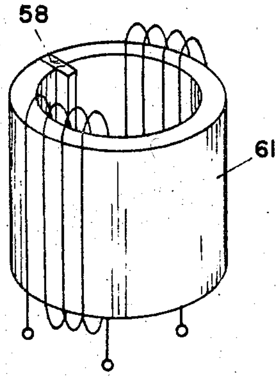
Figure 9:
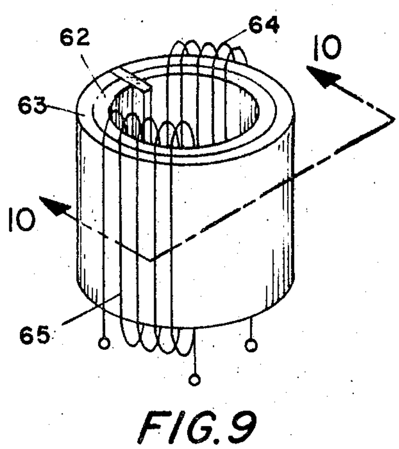
Figure 10:
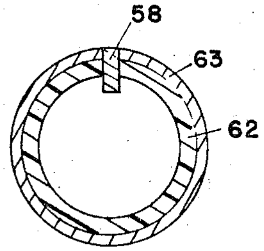

FIG. 8 is a perspective view of another modification of the head in FIG. 6;

FIG. 9 is a perspective view of still another modification of the head in FIG. 6; and FIG. 10 is a sectional view of the head in FIG. 9 taken along the line 10—10.

BACKGROUND AND DESCRIPTION OF THE INVENTION

The invention is concerned with data processing involving the ordering, presentation and use of data in various physical forms including graphic data, and the systems methods, apparatus and devices for handling data bearing media carrying visually presented or graphic information for use in machines. Of particular concern is the handling of discrete information elements such as film cards or film chips. Such data processing systems require techniques for converting an information file into discrete elements, transporting each such discrete element from a file to a point of detection, then to a point of switching and finally to a point of readout, either visually or by machine.

The invention includes methods and apparatus for handling small unmounted film chips as well as larger sections of film called herein "film cards" to distinguish them from the small unmounted "film chips." The handling of the larger film cards in data media preferably involves a supporting carrier frame in addition to the film in itself. The frame is used as a carrier and can therefore carry a number of types of data bearing media. The chip or card may provide its own support or carrier means.

Data bearing cards, aperture cards or punched cards, for example, can be used equally well as a carrier for photographic film chips. The film cards may be coded to provide inherent control of a selection, distribution, recycling, etc. For various applications, magnetic coding, optical coding, and mechanical coding, such as provided by notches, are useful. A magnetic striping adjacent an edge of a carrier or data bearing body is highly desirable for edge scannng to identify a desired medium rapidly. Since a photograph contains an enormous amount of information per unit area, it is frequently desirable to utilize optical coding on the face of a data bearing body or its carrier combined with magnetic and mechanical coding adjacent an edge.

Sections of guide panels have guide tracks to receive a data bearing medium such as a film card and carrier frame. The medium is propelled along the track channels and is normally included at an angle of approximately 45° to the track. The medium is free to move in either direction along the track channels. A number of media may be stacked in a section of track channels. Each medium may be driven along the tracks by an air stream. In this manner there is no problem with friction between the surfaces of film cards mounted on adjacent carriers. For a given system, sections of track are joined for various functions. Means may be provided for trapping and holding an individual medium.

The medium is transported to and stored in various types of bins, each of which includes a basic section of track. The bins may be permanently mounted or movable. The bins are so constructed as securely to hold the media in place. The bin is adapted for insertion into an automatic system with, for example, air stream propulsion or for insertion into a manually controlled handling unit for use as a local file.

While it is normally desirable to transport media oriented at an angle relative to the track, for many purposes it is necessary to move or hold the medium in its own plane. Special sections of track can be provided to convert the orientation of the medium from inclined plane motion to motion in its own plane or any angle in between. For static viewing, contact printing or readout, a selected medium may be trapped and held or moved in its own plane for viewing of its various parts. Motion of the medium along the tracks may be initiated for propulsion by a fluid drive means.

The system contemplates a launching device for launching carriers either singly or in groups into position for propulsion by a fluid drive means. One such system uses a double belt preseparator air drive and toothed release wheel.

Recirculation may be obtained by combining selected sections of track and properly directing fluid drive means to provide, for example, a suitable air stream operative at all points along a desired path. The ability to merge or intermix cards is incorporated in the recirculation system.

Magnetic edge coding greatly enhances the speed and ease with which an individual medium may be identified and selected. A strip of ferro-magnetic material is attached along the surface of the medium adjacent to an edge. Magnetic coding is provided by recording signals having relative positive or negative magnetic polarity at right angles to the edge. The code can be edge-sensed while the medium is moving at high speed and at any angle. A magnetic sensing head may be located in coupling proximity with media moving in a section of track. The preferred coding system used herein requires a definite signal above a desired threshold. Absence of such a definite magnetic signal indicates a defect and produces rejection of the medium. The present system contemplates the use of a serial readout which greatly simplifies the related coincidence logic circuitry.

*Principles of operation*

The problem in the present invention is rapidly, precisely, accurately and efficiently to read out an identification code of a moving data bearing medium to provide information useful for control purposes. Since the media are ordered in a digital sense, it is desirable and necessary to be able to read discrete digits. In the case of magnetic recording, and for a binary code system, a magnetically recorded signal is coupled to a magnetic sensing or playback head.

In the prior art, a number of systems have been proposed that use an angularly oriented magnetic sensing gap with respect to the direction of motion of a magnetically recorded tape and particularly with respect to the surface of the tape disposed adjacent the gap. The present invention is distinguishable from these devices in that linearly disposed discrete information is serially read out by a magnetic sensing head with the gap width disposed at an angle with respect to the linear disposition of the data.

In the case of magnetic recording, as a magnetically recorded indicium moves past a gap in a magnetic sensing head, its field produces a flux which links with the sensing head winding. A voltage is induced in the windings in proportion to the time rate of change of the flux linking the winding. The amplitude of the voltage generated is unaffected by the relative location of the passing magnetic bit with respect to its disposition along the width of the head gap. Thus a single wide gap head may be used to sense a plurality of magnetically recorded indicia by means of serial read-out. The amplitude of the voltage output of the sensing head remains substantially constant regardless of the point of intersection between a given indicium and the sensing axis within the gap width. In the event that no definite signal is present, this indicates a defect.

The motion of the magnetic tape past a magnetic sensing head produces a change in the magnetic flux circuit so as to include the magnetic path in the head. This in turn produces an electrical signal in a winding coupled to the magnetic flux circuit. Although the flux lines emanate from a digital magnetic indicium in opposing directions, an output voltage pulse is produced which has an amplitude above a selected signal threshold. The output voltage is either positive or negative to produce a positive or negative signal indicative of a binary code. In accordance with such a code, for example, "0" may imply a positive pulse and "1" may imply a negative pulse.

The linear display of information is readily applied longitudinally along the edge of a magnetic tape. Reading planar data bearing media by exposing an edge of the medium to a sensing head is superior to face reading the medium. It enables, for example, ready scanning of a plurality of media in rapid efficient sequence.

In the present invention, then, linearly disposed discrete information indicia are moved past a sensing head at an angle relative to a sensing axis.

*Explanation and description of the data processing device in FIGS. 1–5*

Referring now to the drawings, and with particular reference to FIGURE 1, there is here illustrated a data process device embodying the invention.

The device as illustrated generally comprises a transport means coupled to a sorting means for propelling and distributing data bearing media. The sorting means is in turn coupled to storage bins or other desired paths. The sorting means is also coupled back to the transport means for recycling. The transport and sorting means generally comprise an open guide system. Coupled to the guide system along the path of a data bearing medium is a magnetic sensing means. The head is coupled to a recognition means including a coincidence logic circuit which derives an input from a programmer. The output of the logic circuit is coupled to a control circuit which in turn is coupled to a switching device. The switching device is coupled to the sorter for directing selected media along selected predetermined paths.

Thus referring to FIG. 1 there is here illustrated a data processing device generally indicated at 10. The device includes an open guide system having a transport means 11 coupled to a sorting means 12. A data bearing medium 13 is shown guided at an oblique angle relative to its direction of travel. The data bearing medium 13 has a pair of extension tab means 14 and 15 engaging a pair of spaced parallel track channels 16 and 17 which are formed in a supporting panel 18. A magnetic sensing head 19 is shown coupled to the guide path adjacent an edge of a moving medium 13. The head represents a sensing axis-defining member. The head includes a sensing gap 20 presenting a sensing-axis. As will be more fully described below, the head basically comprises ferro-magnetic material formed in the shape of an incomplete loop. The pole pieces at the end of the material are sensing gap defining. The width of the gap presents a sensing axis perpendicular to the direction of motion of the medium 13. There is an angle between the plane of the medium 13 and the line of the width of the gap 20 or the sensing axis. The head 19 is coupled to a recognition means 21 including a coincidence logic circuit. Coupled to the recognition means is a programmer 22. The means 21 are coupled to a control circuit 23 which in turn is coupled to a switching means 24. The switching means is coupled in controlling relation to the sorter 12. The sorter 12 is coupled to the input of the transport means 11 for recycling purposes. The sorter is also coupled to a plurality of storage bins 25, 26, 27, and 28. The bins as shown are indicated as being numbered from 1 through N implying that an arbitrary number of bins are useful in the present device.

Figure 2:
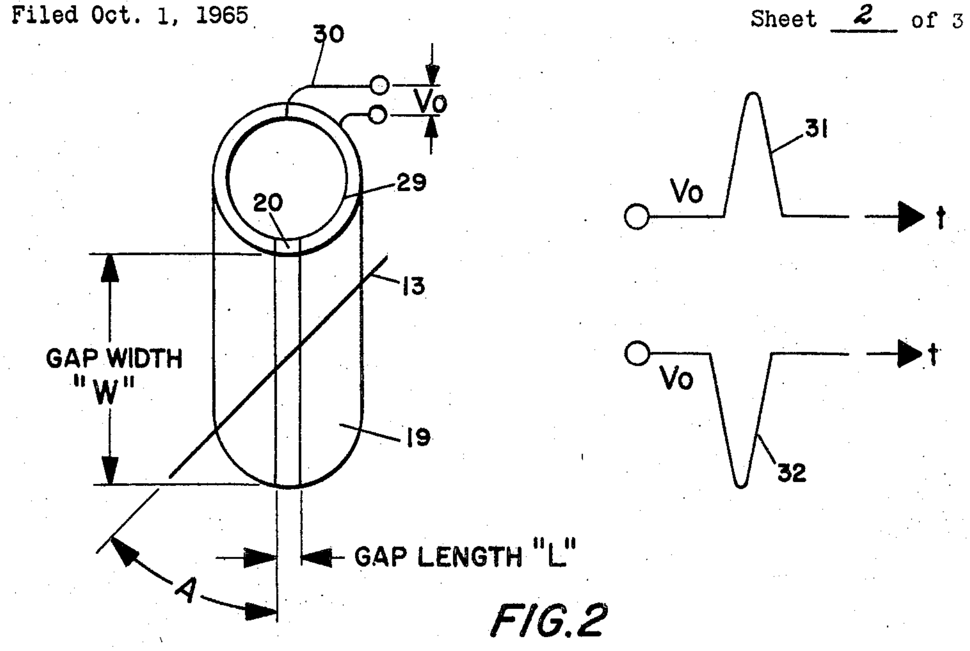
FIG. 2 is an enlarged, schematic, partially perspective view of a magnetic sensing head used with data bearing media in accordance with the invention.

In FIG. 2 the relative orientation of the data bearing medium 13 to the line of the gap width 20, the sensing-axis, is shown. As indicated in FIG. 2, the medium 13 is oriented at an angle A with respect to the sensing axis, the gap width W of the gap 20 and moves past the gap length L. The sensing head 19 includes a magnetic core 29 surrounded by an inductive winding 30 which produces in its output a signal voltage $V_0$. The output voltage $V_0$ generally has the form indicated at 31 or 32 depending upon the polarity of the magnetically recorded signal. The curves 31 and 32 represent signal amplitude $V_0$ taken against a time base $t$.

In FIG. 3 two of the many forms of data bearing media useful with the present invention are shown. FIG. 3(*a*) presents a data bearing medium of the type used with four spaced track channels formed in a pair of parallel supporting panels. Here the medium generally indicated at 33 has a carrier frame 34 which carries a film card of chip 35. Along one edge of the frame and substantially co-planar with the frame and chip is a magnetic striping 36. The magnetic striping 36 carries magnetically recorded identification code indicia 37. The film chip or card 35 carries data in various graphic forms.

The indicia 37 are linearly disposed along an edge of the medium 33 as shown. The magnetic recording and hence the polarized magnetic signals are transverse to the longitudinal direction of the magnetic striping. The carrier is affixed to a pair of cylindrical rods providing tab extensions 38, 39, 40, and 41. The extensions are adapted for engagement with a system of track channels for guiding the medium along a desired path. The channels are characteristically so spaced as to cause the medium to assume an orientation at an angle relative to the track as well as relative to the direction of travel.

If the medium 33 were to move past the gap 20 with the linearly disposed indicia parallel to the sensing axis, the single wide gap sensing head would only see a net differential flux which would produce in its output a signal representative of the integrated effect of the individual magnetic bits. In order to obtain serial readout the medium must be oriented in such a manner as to provide the line of indicia at an angle with respect to the sensing axis. Each indicium is disposed at discrete intervals so chosen with respect to the orientation angle A as to provide isolated indicium, i.e., an isolated signal for readout at a given time.

In FIG. 3(*b*) a data bearing medium adapted for use with track rails is shown. Here a medium generally indicated at 42 is shown. The medium 42 includes a carrier 43 and film chip or card 44 supported by the carrier frame 43. The carrier frame is so formed as to provide a system of four notches 45, 46, 47, and 48 in opposed pairs in spaced relation. The medium is thus adapted for engagement with a system of parallel, spaced track rails which support the medium by engagement with the notches. Again the spacing between the rails is such as to support the medium at an angle relative to its direction of motion. Along an edge of the medium is a magnetic striping 49 with linearly disposed identification code indicia 50.

While the media in FIG. 3 illustrate the identification code striping applied to the frame, it will be apparent that the code may be applied to an integrally formed film chip or card which provides its own support or carrier. In such a case, the film chip or card is so formed as to provide either notches or tab extensions for guidance along track rails or track channels respectively.

Referring now to FIG. 4, there is here illustrated an enlarged fragmentary view of the magnetic striping section of the data bearing medium 33. In this view, the magnetic flux lines are schematically illustrated. Each digit of the identification code is separated by a discrete interval bounded by dashed lines as shown. The ferro-magnetic material is carefully magnetized at spaced discrete intervals to avoid intercoupling. While there must be definite spacial discrimination between indicia, the striping may be continuously magnetized. The recorded indicia, however, must meet the requirement for a single valued signal indication for a given position interval. A given interval, in other words, must contain a predominantly positive or a predominantly negative signal in order to provide an output signal selectively having an identifiable positive or negative amplitude above a selected signal threshold.

FIG. 4 particularly shows the magnetic striping 36 which carries the indicia linearly disposed at discrete intervals. Each identification code indicium is recorded transversely of the magnetic striping or magnetic tape. Such a tape is typically formed of a plastic carrier with an iron oxide suspension. The well-known magnetic tape may be used for this purpose.

Referring to the individual indicium as a magnetic bit, the polarity of each bit is indicated in the drawing. The code as shown indicates a binary identification number 1000–1, for example. The bits between digit 4 and digit N are not shown.

Each magnetic bit may be viewed as an individual bar magnet. The dash line simply indicates the effective boundary region for the fringe field outside the magnet. The encoding takes place in such a manner as to provide a planar magnetic indicia bit with flux lines transverse with the length of the striping. The bit produces flux lines which emanate from the pole in opposite directions out of the plane of the medium. Noting bit No. 2, the polarity here is reversed and the fringe fields 53 and 54 oppose each other and are directed oppositely from the fields relating to the first magnetic bit.

In FIG. 5, a schematic top plan view of the magnetic sensing head and a magnetic bit moving past the gap is presented. There the head 19 is shown with symmetric windings 30 wound around the loop-shaped, ferro-magnetic core 29. The core is discontinuous to provide a gap 20 between the pole pieces. The position of the magnetic bit 37 is such that a flux path including the core 29 is provided in the direction indicated. As the bit 37 moves past the gap 20, the flux path through the core 29 reverses.

*Operation*

A data bearing medium with an identification code of linearly disposed magnetically recorded indicia is introduced to the transport means and propelled, for example, by air flow. A program for directing the media along the desired path is introduced in the programmer 22. This instruction is applied to the recognition means 21. The recognition means 21 includes a coincidence logic circuit which receives, stores, and compares the information with the instruction from the programmer, A circuit of this character is illustrated in a copending application of Donald S. Oliver, entitled Data Processing Circuit, filed Aug. 17, 1961 Ser. No. 132,141. The output of the recognition is applied to a control circuit 23. The control circuit may be a relay system which controls or actuates the switching means 24. The switching means by, for example, obstructing or clearing a track channel or track rail, directs a medium along a desired path. A switching means of this character is described in a copending application to Zeutschel and Cooper, entitled Data Processing System, filed Aug. 17, 1961, Ser. No. 132,114. In the sorter 12, the media are directed to any one of a number of storage bins 25, 26, 27, or 28 or to a recycling path to go through this system again. In addition to the storage functions, the individual medium may be extracted from the system for viewing or other purposes or directed along other paths.

*Description and explanation of the sensing heads in FIGS. 6–10*

Referring now to FIG. 6, there is here illustrated a magnetic sensing head for use with the present invention. The head as shown has a pair of symmetrically disposed toroidal windings 55 and 56. A ferro-magnetic core 57 is assembled from a stack of annular laminations formed from metal such as HY MU 80, an alloy of 4% molybdenum, 79% nickel, and 17% iron, manufactured by Magnetics, Inc. The gap may be 0.010 inch in length and one and a half inches wide. A spacer 58 may be inserted in the gap to maintain the gap stability. Such a spacer may be formed, for example, of copper 0.010 of an inch thick.

A rectangular head is illustrated. The head is formed in two sections. The two sections are each formed from a stack of rectangular C laminations or semi-rectangular, looped-shaped laminations. The sections are affixed together with the gap 60 formed so that the magnetically low reluctance material is touching to provide a low reluctance across the gap 60. The gap provided by the copper spacer 58 (the so-called front gap as opposed to the closed or back gap) provides a high reluctance area. Here again the individual laminae are formed from HY MU 80, for example. Here the windings are symmetrically disposed and layer wound.

The sensing head of FIG. 8 is formed from a single, solid cylindrical shell 61. The shell is so formed as to provide a 0.010 inch gap in which the spacer 58 is placed. The shell 61 is preferably so formed as to self-maintain its configuration out of ferro-magnetic material. The thickness of the shell is chosen to preclude magnetic saturation at desired signal levels. In practice, this shell may be as little as 0.001 inch thick for some applications. The maximum thickness is a matter of choice.

The sensing head as illustrated in FIGS. 9 and 10 comprises an inner cylindrical shell 62 which is formed of non-magnetically permeable material such as copper or brass. The inner shell 62 is added to provide additional dimensional stability and reinforce the core material without interfering with its magnetic properties. Since materials of high magnetic permeability are relatively expensive, it is frequently cheaper to use non-permeable materials in this way. Surrounding the inner shell 62 is an outer shell 63 which is formed of magnetically permeable material such as Mu Metal. A pair of toroidal windings 63 and 64 are symmetrically disposed about the shell as shown.

The present system lends itself to the use of a single channel sensing head which can read a multi-digit identification code. This eliminates the requirement of a separate and individual sensing head for each digit of a code as is necessary, for example, if all digits of the code are read simultaneously.

It is apparent that a single channel, wide gap head is far more economical and simpler in structure than the corresponding multi-channel head. The use of a single channel head and serial readout eliminates the requirement for critical vertical registration as well as greatly simplifying the associated circuitry. It will be apparent that the present invention provides a data processing device which has wide application in the field of digital data processing as well as in the handling of data bearing media carrying graphic information.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A data processing device comprising in combination:

(a) a plurality of planar data bearing cards, said cards having recorded thereon a plurality of bits of information making up a unitary block of information to be sequentially read out one bit after the other as a unit, said unitary block of information being aligned upon each of said data bearing cards along an edge thereof;

(b) a transducer having a sensing axis located beyond said edges, of said cards, said axis forming an acute angle with respect to said edges; and (c) means for producing relative motion between said data bearing cards and said transducer for individually reading said unitary block on each of said cards by sequentially reading out said bits of information primarily by virtue of said acute angle and the operation of said transport means.

2. The combination as set forth in claim 1 wherein said bits of information are magnetically recorded along said edge of said data bearing card and said transducer comprises a unitary magnetic core having a gap and a readout winding coupled thereto responsive to a change in magnetic flux anywhere along the length of said gap occurring at any time.

3. A data processing device comprising:

(a) a plurality of planar data bearing cards each of which has a binary code magnetically recorded at an edge thereof, the magnetic field of said code extending beyond the edge thereof;

(b) means for sequentially transporting each of said cards along a path in a given direction the plane of said cards assuming a first angle with respect to said direction; and (c) a transducer positioned along said given path and beyond said edges of said cards having a sensing axis disposed at a second angle to said direction in coupling proximity with the aforesaid edges bearing said magnetic binary code of cards passing adjacent said sensing axis, said axis forming an acute angle with respect to said edges, and said transducer further including a unitary magnetic core with a gap and a readout winding coupled about said core responsive to a change in magnetic flux anywhere along the length of said gap occurring at any time.

References Cited

UNITED STATES PATENTS

| | | | |
|---|---|---|---|
| 3,160,704 | 12/1964 | Hollingsworth | 179—100.2 |
| 2,937,239 | 5/1960 | Garber et al. | 179—100.2 |
| 2,921,989 | 1/1960 | Serrell | 340—174.1 |
| 2,906,827 | 9/1959 | Gordon et al. | 179—100.2 |

STANLEY M. URYNOWICZ, Jr., *Primary Examiner.*

A. I. NEUSTADT, *Assistant Examiner.*

U.S. Cl. X.R.

179—100.2